US009062176B2

(12) United States Patent
Kishimoto et al.

(10) Patent No.: US 9,062,176 B2
(45) Date of Patent: Jun. 23, 2015

(54) TRANSPARENT FILM

(75) Inventors: Hirotsugu Kishimoto, Toyonaka (JP); Shinji Hashimoto, Kadoma (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 826 days.

(21) Appl. No.: 12/740,401

(22) PCT Filed: Feb. 17, 2009

(86) PCT No.: PCT/JP2009/053133
§ 371 (c)(1),
(2), (4) Date: Apr. 29, 2010

(87) PCT Pub. No.: WO2009/104786
PCT Pub. Date: Aug. 27, 2009

(65) Prior Publication Data
US 2010/0310841 A1  Dec. 9, 2010

(30) Foreign Application Priority Data

Feb. 18, 2008  (JP) .................................. 2008-036447

(51) Int. Cl.
*C08K 7/14* (2006.01)
*C08K 9/08* (2006.01)

(52) U.S. Cl.
CPC ........... *C08K 9/08* (2013.01); *Y10T 428/24942* (2015.01); *C08K 7/14* (2013.01)

(58) Field of Classification Search
USPC ................................................. 428/121, 212
See application file for complete search history.

(56) References Cited

U.S. PATENT DOCUMENTS

| 4,839,442 | A | * | 6/1989 | Craig, Jr. ...................... 528/422 |
| 6,162,876 | A | | 12/2000 | Yeager et al. |
| 6,194,495 | B1 | | 2/2001 | Yeager et al. |
| 6,245,841 | B1 | | 6/2001 | Yeager et al. |
| 6,680,138 | B1 | | 1/2004 | Honma et al. |
| 7,132,154 | B2 | | 11/2006 | Shibahara et al. |
| 2001/0016616 | A1 | | 8/2001 | Yeager et al. |
| 2004/0132867 | A1 | | 7/2004 | Shibahara et al. |
| 2006/0020064 | A1 | | 1/2006 | Bauer et al. |
| 2006/0220278 | A1 | | 10/2006 | Nakamura et al. |
| 2007/0219309 | A1 | * | 9/2007 | Shibahara et al. ............ 524/556 |

FOREIGN PATENT DOCUMENTS

| CN | 1606597 A | | 4/2005 |
| EP | 1 085 038 A1 | | 3/2001 |
| EP | 1 624 015 A1 | | 2/2006 |
| JP | 10045879 | * | 2/1998 |
| JP | 2003-506514 A | | 2/2003 |
| JP | 2004-307811 A | | 11/2004 |
| JP | 2004-307851 A | | 11/2004 |
| JP | WO2005/012383 A1 | | 2/2005 |
| JP | 2005-126481 A | | 5/2005 |
| JP | 2006-022317 | * | 1/2006 |
| JP | 2006-281548 A | | 10/2006 |
| JP | 2007-119630 A | | 5/2007 |

OTHER PUBLICATIONS

Machine Translation of JP 10-045879.*
Suman, J., et al, "Thermoplastic modification of monomeric and partially polymerized Bisphenol A dicyanate ester", Jul. 2005, European Polymer Journal, vol. 41, pp. 2963-2972.*
Machine Translation of JP 2006-022317.*
International Search Report for the Application No. PCT/JP2009/053133 mailed May 7, 2009.
Notification of Reasons for Refusal for the Application No. 2008-036447 from Japan Patent Office mailed Jan. 10, 2012.
The First Office Action for the Application No. 200980101196.0 from the State Intellectual Property Office of People's Republic of China dated Oct. 25, 2011.
Yan, Fusheng et al., "Performance and Application of Cyanate Ester Resin", Engineering Plastic Application, 1996, vol. 24, No. 6, pp. 11-13.
H. Weihan et al., "Study on the Preparation Process and Properties of Ripple Springs with Cyanate Ester/Epoxy Resin Compound," China Academic Journal Electronic Publishing House, Insulating Materials No. 5, 2005, pp. 1-5, with English translation.
Chinese Office Action issued in Chinese Application No. 200980101196.0 dated Aug. 20, 2012, with English translation.

* cited by examiner

*Primary Examiner* — Maria Veronica Ewald
*Assistant Examiner* — Brian Handville
(74) *Attorney, Agent, or Firm* — McDermott Will & Emery LLP

(57) ABSTRACT

A transparent film has a high glass transition temperature, yet retaining high transparency. The transparent film includes a glass fiber substrate impregnated with a resin composition in which a high refractive resin having refractive index higher than the glass fiber is mixed with a low refractive resin having refractive index lower than the glass fiber to have resultant refractive index approximate to that of the glass fiber when cured. The high refractive resin includes a cyanate-ester resin so as to increase a glass transition temperature, yet retaining high transparency.

7 Claims, No Drawings

TRANSPARENT FILM

TECHNICAL FIELD

The present invention is directed to a transparent film.

BACKGROUND ART

As disclosed in Japanese Patent Publication JP2004-307851 A, transparent films have been proposed as a replacement member for a glass plate utilized in a flat-panel display such as a liquid-crystal display, a plasma display, and an organic light emitting diode display.

One example of the transparent film is formed by hot-pressing prepregs each composed of a glass fiber substrate impregnated with a transparent thermoset resin having a refractive index similar to the glass fiber. The combination of the glass fibers and the matrix resin having refractive index compatible to the glass fiber can avoid undue refraction within the transparent film in order to assure good visibility as required for the display.

Generally, an epoxy resin is used as the transparent thermoset resin. In order to approximate the refractive index of the resin to that of the glass fiber, different kinds of epoxy resins one having the refractive index higher than the glass fiber and the other having the refractive index lower than the glass fiber are mixed at a suitable mixing ratio.

When the transparent film is formed by a combination of the epoxy resins having the refractive indexes greater and lower respectively than the glass fiber, minute crack or exfoliation developing at the interface between the epoxy resin and the glass fiber is likely to increase haze factor and therefore lower the visibility. Accordingly, it has been proposed to use an epoxy resin having a low glass transition temperature in order to restrain the minute crack or exfoliation at the interface between the epoxy resin and the glass fiber.

However, since the use of the resin having the low glass transition temperature may reduce heat resistance of the transparent film, it has been a demand of providing the transparent film having a high glass transition temperature in a particular application field of requiring high heat resistance.

DISCLOSURE OF THE INVENTION

In view of the above insufficiency, the present invention has been accomplished to provide a transparent film which shares high transparency and high glass transition temperature.

The transparent film in accordance with the present invention comprises a glass fiber substrate made of glass fibers and impregnated with a resin composition in which a high refractive resin having refractive index higher than the glass fiber is mixed with a low refractive resin having refractive index lower than the glass fiber to have a resultant refractive index approximate to that of the glass fibers when cured. The characterizing feature of the present invention resides in that the high refractive index resin includes a cyanate-ester resin.

According to the present invention, the use of the cyanate-ester resin as the high refractive resin assures to increase a glass transition temperature, yet maintaining high transparency. In addition, the cyanate-ester resin is solid at room temperatures to thereby improve finger touch dryness and handling performance when drying the resin impregnated glass fiber substrate to prepare the prepreg.

Preferably, the resin composition has a glass transition temperature of 170° or more so as to obtain the transparent film of superior heat resistance.

The low refractive resin may be selected from a hydrogenated bisphenol-epoxy resin to obtain the transparent film of high transparency.

The hydrogenated bisphenol-epoxy resin may be a solid-type one for improving the finger touch dryness and handling performance at the time of impregnating the glass fiber substrate with the resin composition and drying the same to prepare the prepreg.

The resin composition may include a curing initiator of zinc octanoate for increasing the glass transition temperature.

It is also preferred that the glass fiber substrate has refractive index of 1.55 to 1.57, the high refractive resin has refractive index of 1.58 to 1.63 when cured, and the low refractive resin has refractive index of 1.47 to 1.53 when cured.

Further, it is preferred to stack more than one sheet of the glass fibers having a thickness of 50 μm or less in order to give improved transparency to the transparent film.

BEST MODE FOR CARRYING OUT THE INVENTION

Now, an explanation is made to a transparent film in accordance with a preferred embodiment of the present invention. The transparent film includes a glass fiber substrate impregnated with a resin composition which is a mixture of a high refractive resin and a low refractive resin having refractive index respectively greater and lower than the glass fibers of the substrate. The high refractive resin is selected from a resin including a cyanate-ester resin. The cyanate-ester resin is a polymer in which cyanate-ester compounds having more than one cyanate group in one molecule are trimerized to form a triazine ring. The cyanate-ester compound includes an aromatic cyanate-ester compound, for example, 2,2-bis(4-cyanatephenyl)propane, bis(3,5-dimethyl-4-cyanatephenyl)methane, 2,2-bis(4-cyanatephenyl)ethane, or their derivatives. One or different kinds of the compounds may be utilized to form the cyanate-ester resin. The resulting cyanate-ester resin has a rigid molecular skeleton to have a high glass transition temperature when cured. Also, since the cyanate-ester resin is solid at room temperatures, it is easily dried to have a finger touch dryness after being impregnated in the glass fiber substrate together with the low refractive resin, thereby improving handling performance of prepregs each obtained by drying the glass substrate impregnated with the resin composition.

When the glass fiber is selected to have refractive index of 1.562, the cyanate-ester resin is preferred to have refractive index of about 1.6. In general, the cyanate-ester resin is preferred to have refractive index in the range of n+0.03 to n+0.06 were n represents refractive index of the glass fiber. In the present invention, the refractive index of the resin denotes the refractive index of the resin in its cured condition, and is defined under the test of ASTM D542.

The low refractive resin may be selected from any epoxy resin having refractive index lower than the glass fiber, and is preferably a hydrogenated bisphenol-epoxy resin. When the glass fiber is selected to have refractive index of 1.562, the low refractive epoxy resin is preferred to have refractive index about 1.5, i.e., in the range of n−0.04 to n−0.08 where n represents the refractive index of the glass fiber.

The low refractive hydrogenated bisphenol-epoxy resin may be one having bisphenol-A, bisphenol-F, or bisphenol-S.

Further, the low refractive hydrogenated bisphenol-epoxy resin is preferred to be one that is solid at room temperatures. Although a hydrogenated bisphenol-epoxy resin that is liquid at room temperatures may be utilized, it can be dried only to finger touch tackiness when preparing the prepreg, and therefore lowering the handling performance of the prepreg. For this reason, the room temperature solid hydrogenated bisphenol-epoxy resin is preferred. The low refractive epoxy resin may be selected from other than the hydrogenated bisphenol-epoxy resin, for example, 1,2-epoxy-4-(2-oxiranyl)cyclohexane. The epoxy resin is utilized in combination with the high refractive index resin for fine adjustment of the refractive index, and is also selected to be solid at the room temperatures for facilitating the manufacture of the transparent films.

Thus, the transparent film of the present invention utilizes the high refractive cyanate-ester resin and the low refractive resin such as the hydrogenated bisphenol-epoxy resin in combination to prepare the resin composition having the resulting refractive index approximate to the refractive index of the glass fibers. A mixing ratio of the high refractive cyanate-ester resin to the low refractive epoxy resin is suitably selected in order to give the resulting refractive index approximating to that of the glass fiber. The refractive index of the resin composition is desired to be as close to that of the glass fiber as possible, and is preferred to be in the range of n−0.02 to n+0.02 where n represents the refractive index of the glass fiber.

The resin composition is prepared to have a glass transition temperature of 170° centigrade or more. With the glass transition temperature of 170° or more, the resulting transparent film becomes highly heat resistant. Although the upper limit of the glass transition temperature is not particularly fixed, it is practically 280° centigrade. The adjustment of the glass transition temperature is made by varying a mixing ratio of cyanate-ester resin in the resin composition. Although depending upon the kinds of the low refractive resin used in combination with the cynate-ester resin, the resin composition can be adjusted to have the glass transition temperature of 170° or more when the cyanate-ester resin is included in the resin composition by weight of 30% or more.

The resin composition may include a curing initiator (curing agent) which is selected from an organic metal salt. The organic metal salt may be a salt of organic acid such as octanoic acid, stearic acid, acetylacetonate, naphthenic acid, or salicylic acid, and a metal such as Zn, Cu, or Fe. Although one or different kinds of salts may be used, zinc octanoate is particularly preferred for increasing the glass transition temperature. The incorporated amount of the organic metal salt in the resin composition is preferred to be in the range of 0.01 to 0.1 PHR, although not limited thereto.

Alternatively, the curing initiator may be selected from a cationic curing agent for enhancing transparency of the resin. The cationic curing agent may be, for example, aromatic sulfonium salt, aromatic iodonium salt, ammonium salt, aluminum chelate, or boron trifluoride-amine complex, although not limited thereto. The incorporated amount of the cationic curing agent in the resin composition is preferred to be in the range of 0.2 to 3.0 PHR, although not limited thereto.

Further, the curing initiator may be selected from a curing catalyst including a tertiary amine such as triethyl amine and triethanol amine, 2-ethly-4-imidazole, 4-methyl-imidazole, or 2-ethyl-4-methyl-imidazole (2E4MZ). The amount of the curing catalyst is preferred to be in the range of 0.5 to 5.0 PHR, although not limited thereto.

As discussed in the above, the resin composition is prepared from a mixture of the high refractive cyanate-ester resin, the low refractive epoxy resin such as hydrogenated bisphenol-epoxy resin, and the curing initiator. The resultant resin composition may be dissolved or dissipated in a solvent as necessary to form a resin varnish. The solvent may be selected from benzene, toluene, xylene, methylethylketon, methylisobutylketon, acetone, methanol, ethanol, isopropyl alcohol, 2-buthanol, ethyl acetate, butyl acetate, propylene glycol monomethyl ether, propylene glycol monomethyl ether acetate, diacetone alcohol, or N,N'-dimethylacetoamide, although not limited thereto.

The glass fiber is preferably selected from E-glass or NE-glass for improving anti-shock performance. The E-glass is referred to as a non-alkali glass widely available for use as resin reinforcing glass fibers, while the NE-glass is tradename of the glass having low dielectric constant and low dielectric loss properties available from "NITTOBO Incorporated". The glass fiber is preferred to have a surface finish by a silane coupling agent to improve anti-shock performance. The glass fiber is preferred to have refractive index of 1.55 to 1.57, and more preferably of 1.555 to 1.565. The use of the glass fiber having the refractive index in the above preferred range assures to provide the transparent film of excellent visibility. The glass fiber is used in the form of either a woven fabric or unwoven fabric.

The glass substrate is impregnated with the varnish of the resin composition, followed by being heated and dried to prepare the prepreg. The substrate is preferred to be dried at a temperature of 100° C. to 160° C. for 1 to 10 minutes.

Two or more sheets of the prepregs are superimposed on each other and are subject to heating and pressing for curing the resin composition to obtain the transparent film. The heating and pressing are preferably made at a raised temperature of 150° C. to 200° C. under a pressure of 1 MPa to 4 Mpa for 10 to 120 minutes, although not limited to such condition.

In the transparent film thus formed, the high refractive cyanate-ester resin is polymerized with the low refractive epoxy resin such as the hydrogenated bisphenol-epoxy resin to form a resin matrix which exhibits a high glass transition temperature in the presence of the cyanate-ester resin, and is therefore responsible for obtaining the transparent film having superior heat-resistance. In addition, since the cyanate-ester resin and the epoxy resin such as the hydrogenated bisphenol-epoxy resin are both excellent transparent materials, the resulting transparent film retains highly transparent characteristic. The glass fiber substrate are incorporated in the transparent film preferably by weight of 25% to 65% to give enhanced anti-shock property by the reinforcing effect as well as sufficient transparency to the film.

Two or more sheets of the glass fiber substrates having a thickness of 10 μm to 50 μm are preferred to be stacked. The maximum number of the substrates is set to be 20 in a practical sense. Although it is normal to impregnate the individual substrates with the resin composition and dry the same to prepare a corresponding number of the prepregs, and to hot-press the stack of the prepregs for obtaining the transparent film, it is equally possible to impregnate the stack of the substrates with the resin composition and dry the resin impregnated stack to prepare a single prepreg, and to hot-press the prepreg into the transparent film.

The present invention is now explained by way of examples.

EXAMPLE 1

52 parts by weight of room temperature solid cyanate-ester resin (available from Lonza in the trade name of "BADCy", 2,2-bis(4-cyanatephenyl)propane, refractive index of 1.59) as the high refractive resin, 48 parts by weight of solid epoxy resin including 1,2-epoxy-4-(2-oxiranyl)cyclohexane (available from Daicel Chemical Industries, Ltd. in the trade name of "EHPE3150", refractive index of 1.51) as the low refractive resin, and 0.02 parts by weight of zinc octanoate as the curing initiator were mixed to prepare a resin composition.

Then, 50 parts by weight of toluene and 50 parts by weight of methyl ethyl ketone were added to the resin composition. The resulting composition was stirred at 70° C. to prepare a varnish of the resin composition. The resin composition exhibits refractive index of 1.56 when cured.

Subsequently, a glass fiber cloth of 25 μm thickness (available from Asahi Kasei EMD Corporation in the trade name of "1037", E-glass, refractive index of 1.562) was impregnated with the varnish of the resin composition followed by being heated at 150° C. for 5 minutes to remove the solvent and half-cure the resin, preparing the prepreg.

Then, two sheets of the prepregs were superimposed and placed in a pressing machine so as to be heat-pressed at 170° C. under a pressure of 2 MPa for 15 minutes, thereby providing a 80 μm thick transparent film having a resin content of 63 wt %.

EXAMPLE 2

A varnish of the resin composition was prepared in the like manner as in Example 1 except that 48 parts by weight of room temperature solid hydrogenated bisphenol-A epoxy resin (available from Japan Epoxy Resin in the trade name of "YL7170", refractive index of 1.51) was incorporated as the low refractive resin. The resin composition exhibits refractive index of 1.56 when cured.

Subsequently, the prepreg was prepared with the use of the varnish of the resin composition in the like manner as in Example 1, and was heat-pressed in the same condition as in Example 1 to provide a 81 μm thick transparent film having a resin content of 63 wt %.

EXAMPLE 3

3 sheets of the prepregs prepared in Example 1 were heat-pressed in the same condition as Example 1 to provide a 91 μm thick transparent film having a resin content of 58 wt %.

EXAMPLE 4

52 parts by weight of room temperature solid cyanate-ester resin (available from Lonza in the trade name of "BADCy", 2,2-bis(4-cyanatephenyl)propane, refractive index of 1.59) as the high refractive resin, 48 parts by weight of room temperature solid epoxy resin including 1,2-epoxy-4-(2-oxiranyl)cyclohexane (available from Daicel Chemical Industries, Ltd. in the trade name of "EHPE3150", refractive index of 1.51) as the low refractive resin, and 1 part by weight of 2-ethyl-4-methyl imidazole (2E4MZ) as the curing catalyst were mixed to prepare a resin composition. Then, 50 parts by weight of toluene and 50 parts by weight of methyl ethyl ketone were added to the resin composition. The resulting composition was stirred at 70° C. to prepare a varnish of the resin composition. The resin composition exhibits refractive index of 1.56 when cured.

Subsequently, the prepreg was prepared with the use of the varnish of the resin composition in the like manner as in Example 1, and was heat-pressed in the same condition as in Example 1 to provide a 83 μm thick transparent film having a resin content of 61 wt %.

EXAMPLE 5

A single sheet of the prepreg prepared in Example 1 was heat-pressed in the same condition as in Example 1 to provide a 50 μm thick transparent film having a resin content of 68 wt %.

EXAMPLE 6

A glass fiber cloth of 80 μm thickness (available from Asahi Kasei Electronics in the trade name of "3313", E-glass, refractive index of 1.562) was impregnated with the varnish of the resin composition of Example 1 followed by being heated at 150° C. for 5 minutes to remove the solvent and half-cure the resin, preparing the prepreg.

Subsequently, a single sheet of the prepreg was heat-pressed in the same condition as in Example 1 to provide a 90 μm thick transparent film having a resin content of 52 wt %.

COMPARATIVE EXAMPLE 1

49 parts by weight of room temperature solid bisphenol-A epoxy resin (available from Japan Epoxy resin in the trade name of "epicoat1006", refractive index of 1.60), 7 parts by weight of room temperature liquid bisphenol-F epoxy resin (available from DIC corporation in the trade name of "epiclon 830S", refractive index of 1.61), 44 parts by weight of room temperature solid epoxy resin including 1,2-epoxy-4-(2-oxiranyl)cyclohexane (available from Daicel Chemical Industries, Ltd. in the trade name of "EHPE3150", refractive index of 1.51) as the low refractive resin, and 9 parts by weight of SbF6-sulfonium salt (available from Sanshin Chemical Industry Co., Ltd. in the trade name of "SI-150L") as a cationic curing agent were mixed to prepare a resin composition. Then, 50 parts by weight of toluene and 50 parts by weight of methyl ethyl ketone were added to the resin composition. The resulting composition was stirred at 70° C. to prepare a varnish of the resin composition. The resin composition exhibits refractive index of 1.56 when cured.

Subsequently, the prepreg was prepared with the use of the varnish of the resin composition in the like manner as in Example 1, and was heat-pressed in the same condition as in Example 1 to provide a 81 μm thick transparent film having a resin content of 63 wt %.

COMPARATIVE EXAMPLE 2

A varnish of the resin composition was prepared in the like manner as in Example 1 except that 44 parts by weight of room temperature solid hydrogenated bisphenol-A epoxy resin (available from Japan Epoxy Resin in the trade name of "YL7170", refractive index of 1.51) was incorporated as the low refractive resin. The resin composition exhibits refractive index of 1.56 when cured.

Subsequently, the prepreg was prepared with the use of the varnish of the resin composition in the like manner as in Example 1, and was heat-pressed in the same condition as in Example 1 to provide a transparent film.

COMPARATIVE EXAMPLE 3

A varnish of the resin composition was prepared in the like manner as in Example 1 except that 44 parts by weight of liquid alicyclic epoxy resin (available from Daicel Chemical Industries, Ltd. in the trade name of "E-DOA") was incorporated as the low refractive resin. The resin composition exhibits refractive index of 1.56 when cured.

Subsequently, the prepreg was prepared with the use of the varnish of the resin composition in the like manner as in Example 1, and was heat-pressed in the same condition as in Example 1 to provide a transparent film.

With regard to each of the transparent films obtained in Examples 1 to 6, and comparative Examples 1 to 3, evaluation was made in terms of the glass transition temperature and the haze factor. The glass transition temperature was measured according to JIS C6481 TMA-method, and the haze factor was measured according to JIS K7136. The results are shown in Table 1 below.

|  |  | Examples | | | | | | Comparative Examples | | |
|---|---|---|---|---|---|---|---|---|---|---|
|  |  | 1 | 2 | 3 | 4 | 5 | 6 | 1 | 2 | 3 |
| High refractive resin | Cyanate-ester (BADCy) | 52 | 52 | 52 | 52 | 52 | 52 |  |  |  |
|  | Solid bisphenol-A (Epicoat 1006) |  |  |  |  |  |  | 49 | 49 | 49 |
|  | Liquid bisphenol-F (Epiclon 830S) |  |  |  |  |  |  | 7 | 7 | 7 |
| Low refractive resin | Solid hydrogenated bisphenol-A |  | 48 |  |  |  |  |  | 44 |  |
|  | EHPE3150 | 48 |  | 48 | 48 | 48 | 48 | 44 |  |  |
|  | E-DOA |  |  |  |  |  |  |  |  | 44 |
| Curing initiator | zinc octanoate | 0.02 | 0.02 | 0.02 |  | 0.02 | 0.02 |  |  |  |
|  | SI-150L |  |  |  |  |  |  | 9 | 9 | 9 |
|  | 2E4MZ |  |  |  | 1 |  |  |  |  |  |
| Glass fiber cloth thickness (μm) |  | 25 | 25 | 25 | 25 | 25 | 80 | 25 | 25 | 25 |
| Staking number of glass fiber cloth |  | 2 | 2 | 3 | 2 | 1 | 1 | 2 | 2 | 2 |
| Transparent film thickness (μm) |  | 80 | 81 | 91 | 83 | 50 | 90 | 81 | 79 | 80 |
| Glass transition temperature (° C.) |  | 242 | 183 | 242 | 202 | 242 | 242 | 151 | 116 | 172 |
| Haze factor |  | 2.5 | 2.4 | 2.8 | 2.9 | 3.4 | 2.9 | 2.3 | 2.5 | 5.1 |
| Prepreg Handling |  | Good | Good | Good | Good | Good | Good | Good | Good | Poor (Powder drop) |

(All incorporated resin amounts are denoted by parts by weight)

Also, prepregs of Examples 1 to 6, and comparative Examples 1 to 3 were evaluated in terms of handling performance. In Table 1, "good" indicates the absence of finger touch tackiness and powder drop, while "poor" indicates the presence of finger touch tackiness and the powder drop for the prepreg.

As seen in Table 1, Examples 1 to 6 using the cyanate-ester resin as the high refractive resin exhibit the glass transition temperature as high as above 170° C., and low haze factor, which evidences that the transparent films of these Examples have high glass transition temperature, yet retaining high transparency.

With regard to comparative Examples 1 to 3 using the bisphenol epoxy resin as the high refractive resin, low glass transition temperature of less than 170° C. is seen in comparative Examples 1 and 2, and high haze factor or the low transparency is seen in comparative Example 3.

Also seen from Table 1 is that Examples 1 to 4 using more than one sheet of the glass fiber cloth of 25 μm thick show lower haze factor and are therefore more transparent than Examples 5 using the single sheet of the glass fiber cloth of 25 μm thick, and Example 6 using the single sheet of the glass fiber cloth of 80 μm thick.

The invention claimed is:

1. A transparent film comprising:
   a glass fiber substrate made of glass fibers and impregnated with a resin composition in which a high refractive resin having refractive index higher than the glass fiber is mixed with a low refractive resin having a refractive index lower than said glass fiber to have a resultant refractive index approximate to that of said glass fiber when cured, wherein:
   said high refractive resin includes a cyanate-ester resin,
   said low refractive resin includes an epoxy resin including 1,2-epoxy-4-(2-oxiranyl)cyclohexane,
   said resin composition includes a curing initiator of zinc octanoate, and
   said cyanate-ester resin is 2,2-bis(4-cyanatephenyl)propane.

2. A transparent film as set forth in claim 1, wherein said resin composition has a glass transition temperature of 170° C. or more.

3. A transparent film as set forth in claim 1, wherein said glass fiber substrate has refractive index of 1.55 to 1.57, said high refractive resin has refractive index of 1.58 to 1.63, and said low refractive resin has refractive index of 1.47 to 1.53.

4. A transparent film as set forth in claim 1, wherein more than one sheet of said glass fiber substrate having a thickness of 50 μm or less are stacked together.

5. A transparent film as set forth in claim 2, wherein more than one sheet of said glass fiber substrate having a thickness of 50 μm or less are stacked together.

6. A transparent film as set forth in claim 3, wherein more than one sheet of said glass fiber substrate having a thickness of 50 μm or less are stacked together.

7. A transparent film comprising:
   a glass fiber substrate made of glass fibers and impregnated with a resin composition in which a high refractive resin having refractive index higher than the glass fiber is mixed with a low refractive resin having a refractive index lower than said glass fiber to have a resultant refractive index approximate to that of said glass fiber when cured, wherein said high refractive resin is 2,2-bis(4-cyanatephenyl)propane, said low refractive resin including an epoxy resin including 1,2-epoxy-4-(2-oxiranyl)cyclohexane, and said resin composition including a curing initiator of zinc octanoate.

* * * * *